United States Patent
Yoon

(10) Patent No.: US 12,222,208 B2
(45) Date of Patent: Feb. 11, 2025

(54) AUTONOMOUS DRIVING SYSTEM IN HETEROGENEOUS SD MAP AND HD MAP ENVIRONMENT AND METHOD FOR OPERATING AUTONOMOUS DRIVING SYSTEM

(71) Applicants: Hyundai Motor Company, Seoul (KR); Kia Corporation, Seoul (KR)

(72) Inventor: Sung Won Yoon, Yongin-si (KR)

(73) Assignees: HYUNDAI MOTOR COMPANY; KIA CORPORATION, Seoul (KR)

( * ) Notice: Subject to any disclaimer, the term of this patent is extended or adjusted under 35 U.S.C. 154(b) by 225 days.

(21) Appl. No.: 17/964,096

(22) Filed: Oct. 12, 2022

(65) Prior Publication Data
US 2023/0280166 A1    Sep. 7, 2023

(30) Foreign Application Priority Data
Mar. 7, 2022    (KR) .................. 10-2022-0028862

(51) Int. Cl.
*G01C 21/32* (2006.01)
*B60W 60/00* (2020.01)

(52) U.S. Cl.
CPC .......... *G01C 21/32* (2013.01); *B60W 60/001* (2020.02); *B60W 2556/40* (2020.02); *B60W 2556/50* (2020.02)

(58) Field of Classification Search
CPC ...... G01C 21/005; G01C 21/12; G01C 21/26; G01C 21/28; G01C 21/30; G01C 21/32; G01C 21/34; G01C 21/3415; G01C 21/3407; G01C 21/3605; G01C 21/3614; G01C 21/362; G01C 21/3804; G01C 21/3856; G01C 21/387; G01C 21/3885; G01C 21/3896; G05D 1/0212; G05D 1/0274; G05D 2105/20; G05D 2105/22;
(Continued)

(56) References Cited

U.S. PATENT DOCUMENTS

2011/0288763 A1    11/2011  Hui
2013/0151062 A1*   6/2013  Lee .................. G05D 1/0278
                                                    701/26
(Continued)

FOREIGN PATENT DOCUMENTS

CN    111102988 A  *  5/2020
JP    2011179844 A  *  9/2011
(Continued)

OTHER PUBLICATIONS

English translation of CN111102988 (Year: 2020).*
English translation of JP2011179844 (Year: 2011).*

*Primary Examiner* — Russell Frejd
*Assistant Examiner* — Brandon Z Willis
(74) *Attorney, Agent, or Firm* — SLATER MATSIL, LLP

(57) ABSTRACT

An embodiment is an autonomous driving system in a heterogeneous SD map and precise map environment, which can provide an autonomous driving service using a heterogeneous SD map having properties that do not match those of a precise map. The autonomous driving system in a heterogeneous SD map and HD map environment includes a service platform and an autonomous vehicle, and the operation and operation method of the system depend on whether a user can input TBT in addition to a start point and a destination.

17 Claims, 6 Drawing Sheets

(58) Field of Classification Search
CPC ......... B60W 60/001; B60W 60/00253; B60W 2556/40; B60W 2556/45; B60W 2556/50; G06Q 50/40; G06Q 50/43; G06Q 50/47
See application file for complete search history.

(56) References Cited

U.S. PATENT DOCUMENTS

| | | | | |
|---|---|---|---|---|
| 2016/0138924 | A1* | 5/2016 | An | G01C 21/34 701/25 |
| 2020/0348147 | A1* | 11/2020 | Maeda | G01C 21/3691 |
| 2021/0180978 | A1* | 6/2021 | Jin | G06Q 30/0261 |
| 2022/0120582 | A1* | 4/2022 | Pei | G01C 21/3407 |

FOREIGN PATENT DOCUMENTS

| | | | |
|---|---|---|---|
| JP | 2013160714 | A | 8/2013 |
| JP | 2019012150 | A | 1/2019 |
| KR | 20200068063 | A | 6/2020 |

* cited by examiner

AUTONOMOUS DRIVING SYSTEM IN HETEROGENEOUS SD MAP AND HD MAP ENVIRONMENT AND METHOD FOR OPERATING AUTONOMOUS DRIVING SYSTEM

CROSS-REFERENCE TO RELATED APPLICATIONS

This application claims the benefit of Korean Patent Application No. 10-2022-0028862, filed on Mar. 7, 2022, which is hereby incorporated by reference in its entirety.

TECHNICAL FIELD

The present invention relates to an autonomous driving system and a method for operating the same.

BACKGROUND

General autonomous driving can be achieved in such a manner that an occupant sets a driving route by directly inputting a starting point (hereinafter referred to as a start point) and a destination into an autonomous vehicle and the autonomous vehicle travels along the set driving route upon determining that it is ready to drive. There are various methods and means for inputting a start point and a destination. For example, it is possible to input a start point and a destination into an autonomous vehicle by touching and selecting the start point and the destination through a menu provided by an internal panel of the autonomous vehicle or by inputting text or voice.

Recently, for example, technology for providing an autonomous vehicle driving service even in a service platform that provides a ride-hailing service has been proposed. When a user wants to operate an autonomous vehicle using the service platform, the user accesses the service platform, inputs a start point and a destination, and when a driving route is determined according to the input information, the service platform manages the operation of the autonomous vehicle.

An autonomous driving system completes setting of a driving route through a process of setting a global path having a starting point and a destination as a start point and an end point of the route, and then setting a local path corresponding to the global path based on a HD map.

Here, a global path is generated using a standard definition (SD) map (or SD map information) and is an approximate driving route of an autonomous vehicle from a start point to a destination, for example, a route indicating roads on which the vehicle will travel as one line. A local path refers to a detailed route generated by applying a current location and a moving direction of the vehicle to the global path using a high definition (HD) map (or HD map information) and can be understood as a route indicating the roads of the global path indicated by one line as a plurality of lanes corresponding thereto.

If the properties of the SD map and the HD map used to set the global path and the local path are identical, there is no problem in matching map information. However, if a production entity of the SD map is different from that of the HD map, or if the SD map and the HD map are produced according to different production standards, then the properties of the SD map become different from those of the HD map, and thus it is impossible to generate a local path matching a global path by matching the SD map and the HD map through a simple method.

Even when map developers are different, if the developers share a database, it is possible to match the SD map and the HD map using the shared database. However, in reality, it is rare that different developers share a database, and thus an attempt to match the SD map and the HD map in this way is ineffective.

Properties of a produced map include, for example, link/node shape information (including coordinate system information), link/node ID information (primary key), road grade (normal, high-speed, urban high-speed) information, road type (IC/JC, intersection, main line non-separation) information, link traffic information (passing vehicle type and time-varying regulation) information, maximum speed limit information, link additional information (exclusive median bus lane, side bus lane, etc.), exclusive vehicle road information, U-turn point information, bus time-varying regulation information, speed camera information, and protected area information.

Another method of matching a SD map and a HD map that have different properties and do not share a database is to compare internal properties of the SD map and the HD map to generate an appropriate matching table. However, since the composition of a map belongs to intellectual property, this method also has the disadvantage of requiring technical and legal agreements between developers.

Both a SD map used to generate a global path and a HD map used to generate a local path are embedded in an autonomous vehicle, and there is no problem in matching the SD map and the HD map because the SD map and the HD map have the same developer. For convenience of description, hereinafter, a SD map that matches a HD map is defined as a matching-based SD map, and a SD map that does not match a HD map is literally described as a SD map.

The service platform also uses SD map information when a user enters a start point and a destination. However, it is common that a SD map used in the service platform does not match a HD map embedded in an autonomous vehicle. Accordingly, the service platform must be able to use a matching-based SD map installed in an autonomous vehicle after consultation with the manufacturer of the autonomous vehicle to which the service platform intends to provide a server, but there are disadvantages in that legal and economic problems such as the burden of royalties due to use of the matching-based SD map along with permission to use need to be solved.

SUMMARY

The present invention relates to an autonomous driving system and a method for operating the same which can be applied in an environment in which both a high definition (HD) map and a heterogeneous standard definition (SD) map (also referred to as 'standard map' or 'navigation map'), which has properties that do not one-to-one match those of the HD map, are used.

An object of the present invention is to propose an autonomous driving system in a heterogeneous SD map and HD map environment which can operate autonomous driving services using a heterogeneous SD map having properties that do not match those of a HD map.

Another object of the present invention is to propose a method of operating an autonomous driving system in a heterogeneous SD map and HD map environment which can operate autonomous driving services using a heterogeneous SD map having properties that do not match those of a HD map.

It will be appreciated by persons skilled in the art that the objects that could be achieved with the present invention are not limited to what has been particularly described hereinabove and the above and other objects that the present invention could achieve will be more clearly understood from the following detailed description.

To achieve these objects and other advantages and in accordance with the purpose of the invention, as embodied and broadly described herein, an autonomous driving system in a heterogeneous SD map and HD map environment includes a service platform and an autonomous vehicle. The service platform transmits a start point and a destination input by a user through a (first) SD map to the autonomous vehicle. The autonomous vehicle generates a global path using the start point, the destination, and a matching-based (second) SD map stored therein according to a preset program and generates a local path matching the global path using a HD map stored therein. Here, the global path includes a turn-by-turn (TBT) guidance between the start point and the destination, the SD map is a map having properties that do not match properties of the HD map, and the matching-based SD map is a map having properties matching the properties of the HD map.

In another aspect of the present invention, an autonomous driving system in a heterogeneous SD map and HD map environment includes a service platform and an autonomous vehicle. The service platform transmits a start point, a destination, and TBT input by a user to the autonomous vehicle using a SD map received from an external navigation system and provided to the user. The autonomous vehicle generates a global path using the start point, the destination, the TBT, and a matching-based SD map stored therein according to a preset program, generates a local path using the global path and a HD map stored therein, and travels along the local path. Here, the SD map is a map having properties that do not match properties of the HD map, the matching-based SD map is a map having properties matching the properties of the HD map, and the external navigation system is a navigation system different from a navigation system built in the autonomous vehicle.

In another aspect of the present invention, a method for operating an autonomous driving system in a heterogeneous SD map and HD map environment includes inputting, by a user, a start point and a destination using a SD map provided by a service platform using a call software (SW), transmitting, by the service platform, the start point and the destination to an autonomous vehicle, the autonomous vehicle generating a global path using the start point, the destination, and a matching-based SD map stored in the autonomous vehicle according to a preset program and generating a local path using the generated global path and a HD map stored in the autonomous vehicle, and the autonomous vehicle traveling along the local path, wherein the global path includes TBT between the start point and the destination, the SD map is a map having properties that do not match properties of the HD map, and the matching-based SD map is a map having properties matching the properties of the HD map.

In another aspect of the present invention, a method for operating an autonomous driving system in a heterogeneous SD map and HD map environment includes inputting, by a user, a start point and a destination using a SD map received by a service platform from an external navigation system and provided to the user, the navigation system generating TBT using the start point and the destination and transmitting the start point, the destination, and the TBT to the service platform, transmitting the start point, the destination, and the TBT from the service platform to an autonomous vehicle, the autonomous vehicle generating a global path using the start point, the destination, the TBT, and a matching-based SD map stored in the autonomous vehicle according to a preset program and generating a local path using the global path and a HD map stored in the autonomous vehicle, and the autonomous vehicle traveling along the local path, wherein the SD map is a map having properties that do not match properties of the HD map, the matching-based SD map is a map having properties matching properties of the HD map, and the external navigation system is a navigation system different from a navigation system built in the autonomous vehicle.

In another aspect of the present invention, a method for operating an autonomous driving system in a heterogeneous SD map and HD map environment includes a user accessing a service platform through a call SW, determining whether a navigation system is able to generate TBT, generating, by an autonomous vehicle, a first global path including the TBT and a first local path matching the first global path upon determining that the navigation system is not able to generate the TBT, generating the TBT by the navigation system and generating, by the autonomous vehicle, a second global path including the TBT and a second local path matching the second global path upon determining that the navigation system is able to generate the TBT, and operating the autonomous vehicle along the first local path or the second local path.

As described above, according to the autonomous driving system and the method of operating the autonomous driving system in a heterogeneous SD map and HD map environment according to the present invention, it is possible to enable autonomous driving using a SD map instead of a matching-based SD map for autonomous driving through a SD map and HD map interface for autonomous driving, and to implement autonomous driving & mobility services embracing various service platform providers according to information added to the interface. In this case, the services can be implemented even if mobility service providers such as buses or trains that simply show approximate driving information do not own a SD map navigation solution. In the case of a mobility service of showing detailed driving information, mobility service providers can specialize the service as a unique navigation solution, and there is no need to perform a supplementary operation such as changing a SD map to a SD map matching a HD map to be used for a mobility service for autonomous driving, or changing a HD map.

It will be appreciated by persons skilled in the art that the effects that can be achieved with the present invention are not limited to what has been particularly described hereinabove and other advantages of the present invention will be more clearly understood from the following detailed description.

DETAILED DESCRIPTION OF ILLUSTRATIVE EMBODIMENTS

Figure 1:
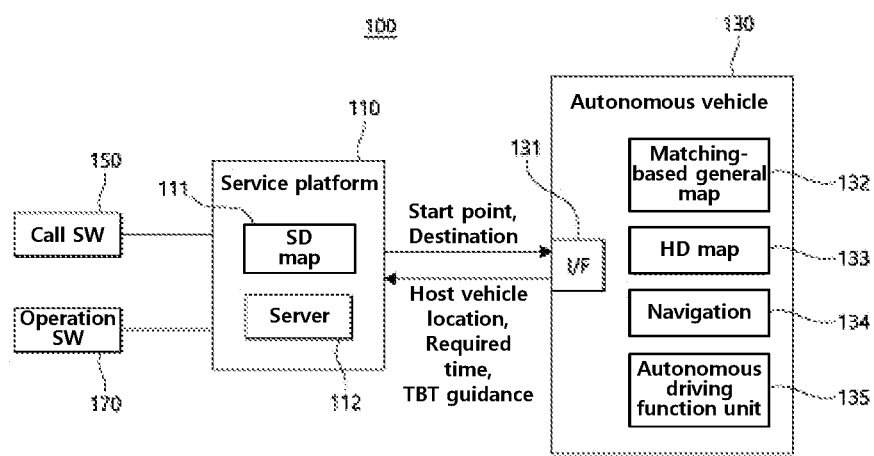
FIG. 1 illustrates an embodiment of an autonomous driving system in a heterogeneous SD map and HD map environment according to an embodiment of the present invention.

In order to fully understand the present invention, the operational advantages of the present invention, and the objects achieved by the practice of the present invention, reference should be made to the accompanying drawings describing exemplary embodiments of the present invention and the contents described in the accompanying drawings.

Hereinafter, the present invention will be described in detail by describing embodiments of the present invention with reference to the accompanying drawings. Like reference numerals in the figures indicate like elements.

FIG. 1 illustrates an embodiment of an autonomous driving system in a heterogeneous SD map and HD map environment according to an embodiment of the present invention.

Referring to FIG. 1, an autonomous driving system 100 in a heterogeneous SD map and HD map environment according to an embodiment of the present invention includes a service platform 110 and an autonomous vehicle 130.

In some embodiments, the service platform 110 includes a SD map 111 and a server 112, and the SD map 111 (sometimes referred to as general map) is a SD map that does not match a HD map 133 (sometimes referred to as a precise map) included in the autonomous vehicle 130 which will be described later. For example, the SD map 111 is a map stored in the service platform 110 as a heterogeneous SD map having properties different from those of the HD map 133 and including information sufficient for a user to input a start point and a destination. Since there are various operators of the service platform 110, the properties of the SD map 111 may also vary depending on the service platform 110.

The server 112 receives an input start point and a destination from a user who wants to use the autonomous vehicle 130 using information of the SD map 111, transfers the starting point and destination input by the user to the autonomous vehicle 130, and reproduces driving information received from the autonomous vehicle 130 as it is or by processing it in a way that can be recognized by the user. The service platform 110 includes, for example, a service platform that provides a ride-hailing service.

A call SW 150 enables a user to subscribe to the service platform 110 or access the service platform 110, input a start point and a destination, and monitor an actual driving situation of the autonomous vehicle 130.

An operation SW 170 accesses the service platform 110 to provide a route to a destination to an emergency driver who is boarding the autonomous vehicle 130 or a remote operator who operates the operation of the autonomous vehicle 130 from the outside of the autonomous vehicle 130 or checks/processes passengers getting on and off the autonomous vehicle 130.

The call SW 150 and the operation SW 170 may be implemented in the form of an application and hardware of an active element and a passive element. In some embodiments, the calling SW 150 and the operation SW 170 in the form of an application are mounted on the active and passive element and may also be implemented like a mobile terminal.

The autonomous vehicle 130 includes an interface 131, the HD map 133, a matching-based SD map 132 having properties matching the HD map, a navigation system 134, an autonomous driving function unit 135, and a control unit. The control unit generates a global path using a start point and a destination received from the service platform 110 via the interface 131, the matching-based SD map and the HD map 133 according to a program stored in advance, and generates a local path that matches the global path. In particular, the autonomous vehicle 130 may generate route information including information on changes in a traveling direction on a specific road included in the local path and include the route information in the local path.

Here, the information on changes in a traveling direction includes vehicle moving or traveling direction change information (Turn By Turn (TBT)), such as traveling straight, turning left, turning right, and U-turn. The navigation system 134 may search for a global path and a local path based on the matching-based SD map 132 that matches the HD map 133 such as AutoEver local PC navigation and Blue Link.

The autonomous vehicle 130 controls the autonomous driving function unit 135 to travel along a set local path in a situation in which it can travel and transmits traveling direction change information and a current location of the autonomous vehicle 130, a time duration required to reach a destination, and TBT during traveling to the service platform 110.

Figure 2:
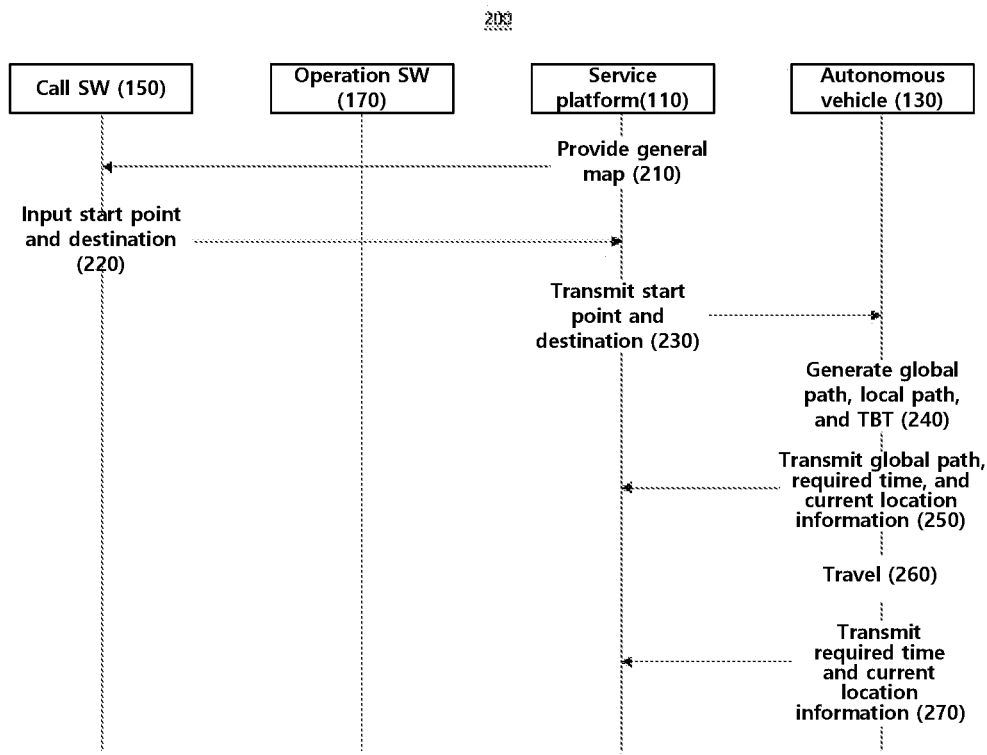
FIG. 2 illustrates an embodiment of a method for operating the autonomous driving system in a heterogeneous SD map and HD map environment shown in FIG. 1.

FIG. 2 shows an embodiment of a method for operating the autonomous driving system in a heterogeneous SD map and HD map environment shown in FIG. 1.

Referring to FIG. 2, the method for operating the autonomous driving system includes a step 210 in which, when a user accesses the service platform 110 through the call SW 150, the service platform 110 provides the SD map 111—that does not match the HD map 133 included in the autonomous vehicle 130—to the user through the call SW 150. The method further includes a step 220 in which the user or a driver inputs a start point and a destination using the SD map information provided by the service platform 110 using the call SW 150, a step 230 in which the service platform 110 transmits the start point and the destination input by the user to the autonomous vehicle 130, a step 240 in which the autonomous vehicle 130 generates a global path using the start point and the destination received from the service platform 110 and the matching-based SD map 132 and the HD map 133 stored therein and generates a local path matching the global path, and a step 260 in which the autonomous vehicle 130 travels along the local path. The method may further include a step 250 in which the autonomous vehicle 130 transmits the generated global path, a time duration required to reach the destination, and current location information of the vehicle to the service platform 110.

The method may further include a step 270 of transmitting the current location information (host vehicle location), a time duration required to reach the destination (required time), and a TBT guidance of the autonomous vehicle 130 during traveling (260) to the service platform 110.

In particular, the autonomous vehicle 130 may generate a TBT guidance including traveling direction change information regarding a specific road included in the local path and include the TBT guidance in the local path.

In the embodiment illustrated in FIGS. 1 and 2, when the autonomous vehicle 130 generates a global path using the received start point and destination, and then generates a local path using the global path, the autonomous vehicle 130 may arbitrarily set a TBT guidance on the local path according to a preset program.

A method through which a user inputs a start point and a destination may be implemented in various manners, such as a method through which the user touches a corresponding area of a touchscreen and a method through which the user expresses a start point and a destination by voice.

In the embodiment illustrated in FIGS. 1 and 2, the SD map 11 stored in the service platform 110 is delivered to the user, and the service platform 110 simply transmits a start point and a destination input by the user to the autonomous vehicle 130. In another embodiment which will be described below, the service platform 110 uses a SD map provided by a navigation system separate from the service platform 110 rather than the SD map 111 stored in the service platform 110.

Figure 3:
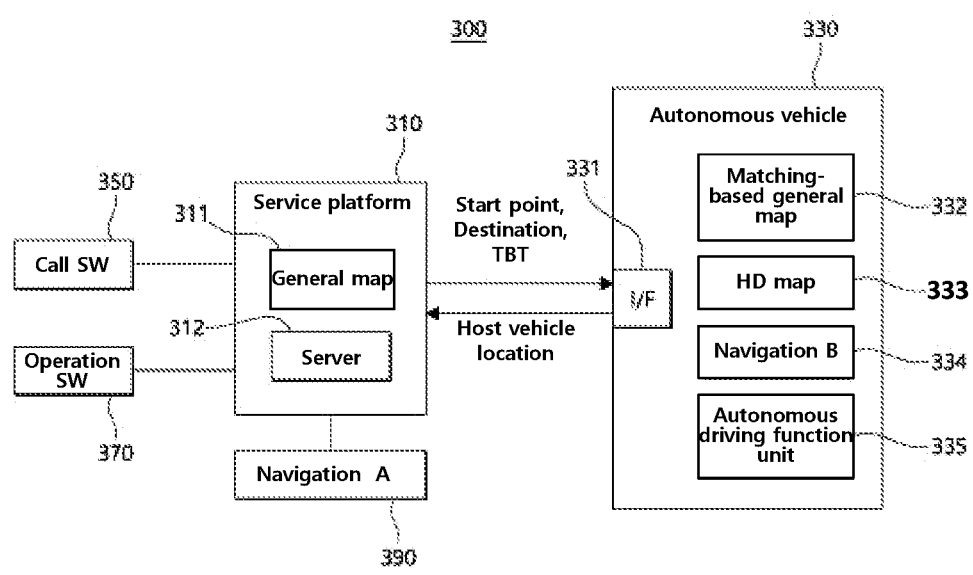
FIG. 3 illustrates another embodiment of an autonomous driving system in a heterogeneous SD map and HD map environment according to an embodiment of the present invention.

FIG. 3 illustrates of an autonomous driving system in a heterogeneous SD map and HD map environment according to an embodiment of the present invention.

Referring to FIG. 3, the autonomous driving system 300 in a heterogeneous SD map and HD map environment according to an embodiment of the present invention includes a service platform 310 and an autonomous vehicle 330 which comprises a navigation B 334 and an autonomous driving function unit 335.

The functions of the service platform 310, the autonomous vehicle 330, a call SW 350, and an operation SW 370 illustrated in FIG. 3 are almost the same as the functions of the service platform 110, the autonomous vehicle 130, the call SW 150, and the operation SW 170, and thus only differences therebetween will be described here.

The service platform 110 shown in FIG. 1 provides the SD map 111, that is, a SD map that does not match the HD map 133 installed in the autonomous vehicle 130 but enables a user to select a start point and a destination therethrough, to the user, whereas the service platform 310 shown in FIG. 3 provides a SD map (not shown) provided by a navigation system A 390 rather than the SD map 311 stored in the service platform 310 to the user through a server 312. Accordingly, when the user inputs a start point and a destination using the call SW 350, the navigation system A 390 may generate TBT according to a preset program. The service platform 310 transmits the TBT generated by the navigation system A 390 and the start point and destination input by the user to the autonomous vehicle 330.

The navigation system A 390 may transmit information on a required time duration according to the start point and destination input by the user to the call SW 350 or the operation SW 370.

The autonomous vehicle 330 generates a global path using the start point, destination, and TBT received from the service platform 310 and generates a local path using the generated global path.

Figure 4:
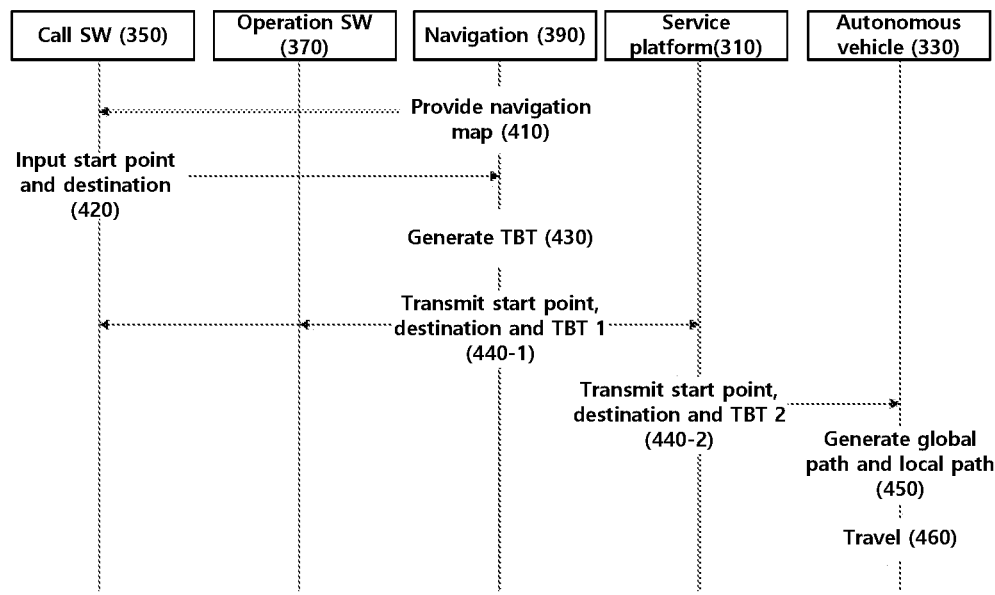
FIG. 4 illustrates an embodiment of a method for operating the autonomous driving system in a heterogeneous SD map and HD map environment shown in FIG. 3.

FIG. 4 illustrates an embodiment of a method for operating the autonomous driving system in a heterogeneous SD map and HD map environment shown in FIG. 3.

Referring to FIG. 4, the method for operating the autonomous driving system includes a step 410 in which, when a user accesses the service platform 310 through the call SW 350, the service platform 310 provides a SD map, that does not match the HD map 333, to the user using the navigation system A 390 through the call SW 350. The method further includes a step 420 in which the user inputs a start point and a destination using the SD map provided by the navigation system A 390 using the call SW 350, a step 430 in which navigation system A 390 generates TBT using the start point and destination input by the user, a step 440-1 in which the navigation system A 390 transmits the start point, the destination and the TBT to the service platform 310, a step 440-2 in which the service platform 310 transmits the start point, the destination, and the TBT received from the navigation system A 390 to the autonomous vehicle 330, a step 450 in which the autonomous vehicle 330 generates a global path using the start point, the destination, and the TBT received from the service platform 310, and the matching-based SD map 332 stored therein and generates a local path matching the global path using the HD map 333, and a step 460 in which the autonomous vehicle travels along the local path.

In the embodiment illustrated in FIGS. 1 and 2, when a global path or a local path is generated using a start point and a destination, TBT is randomly generated by the autonomous vehicle 330. On the other hand, in the embodiment illustrated in FIGS. 3 and 4, when the autonomous vehicle 330 generates a global path and a local path using the matching-based SD map 332 and the HD map 333, TBT generated by the navigation system A 390 must be reflected in generation of the global path and the local path.

The navigation system A 390 shown in FIGS. 3 and 4 includes a Naver map information service, a T map, or the like.

In some embodiments of the present invention, the navigation system A 390 separate from the service platform or the autonomous vehicle generates TBT included in a global path or a local path from a start point to a destination, and the autonomous vehicle generates a final global path and local path, and thus a global path and a local path can be generated even when the properties of a SD map used for a user to input the start point and the destination do not match those of a HD map installed in the autonomous vehicle.

The autonomous driving systems 100 and 300 shown in FIGS. 1 and 3 can be distinguished according to whether the service platforms 110 and 310 utilize the navigation system A 390, and they are implemented and used as separate systems in SD. When the systems are distinguished from each other, a user may or may not be able to directly input TBT depending on the system used by the user.

However, if there is an autonomous driving system in which the autonomous driving systems shown in FIGS. 1 and 3 are combined, as will be described below, the service platform and the method for operating the autonomous vehicle may be changed depending on situations.

Figure 5:
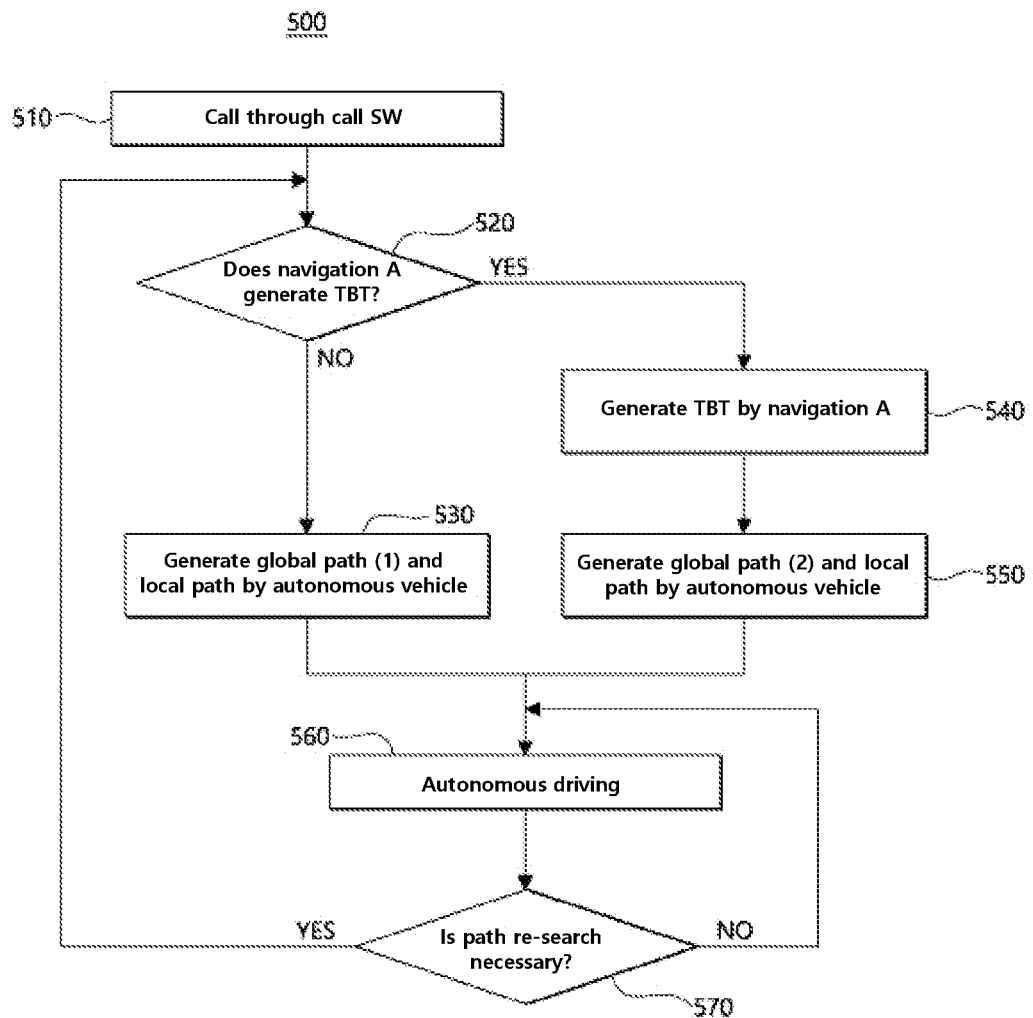
FIG. 5 illustrates another embodiment of a method for operating the autonomous driving system in a heterogeneous SD map and HD map environment according to an embodiment of the present invention.

FIG. 5 illustrates another embodiment of a method for operating an autonomous driving system in a heterogeneous SD map and HD map environment according to an embodiment of the present invention.

Referring to FIG. 5, a method 500 for operating an autonomous driving system in a heterogeneous SD map and HD map environment according to an embodiment of the present invention includes a step 510 in which a user accesses a service platform through a call SW and inputs a start point and a destination, a step 520 of determining whether the navigation system A can generate TBT, a step 530 in which the autonomous vehicle generates a global path and a local path upon determining that navigation system A cannot generate TBT (No in step 520), a step 540 in which the navigation system A generates TBT upon determining that the navigation system A can generate the TBT (Yes in step 520), a step 550 in which the autonomous vehicle generates a global path and a local path using the TBT generated by the navigation system A, a step 560 of performing autonomous driving along the local path generated by the autonomous vehicle, and a step 570 of determining whether it is necessary to re-search a path during autonomous driving.

A step 520 of determining whether the navigation system A can generate TBT is performed upon determining that re-search is necessary (Yes in step 570), and the step of operating the autonomous vehicle is performed upon determining that re-search is not necessary (No in step 570).

As described above, it can be ascertained that, when there is an autonomous driving system (not shown) in which the two autonomous driving systems shown in FIGS. 1 and 3 are combined, it is possible to select whether TBT is generated by the navigation system A or the autonomous vehicle according to whether the navigation system A 390 is applicable in the method 500 for operating the autonomous driving system shown in FIG. 5.

In FIG. 5, in some embodiments, a global path 1 is a global path reflecting TBT arbitrarily generated by the autonomous vehicle, and a global path 2 is a global path reflecting TBT provided by the navigation system A in the autonomous vehicle.

Figure 6:
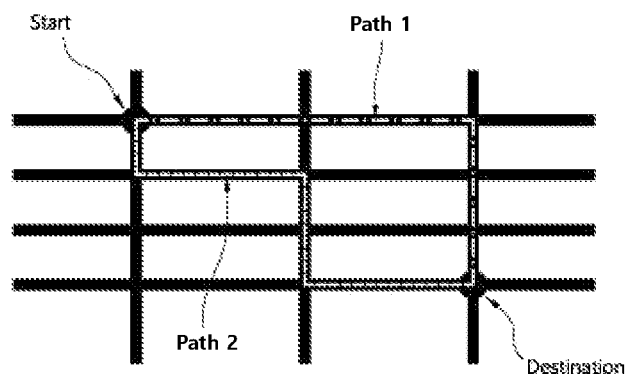
FIG. 6 illustrates an embodiment of traveling direction change information.
Figure 6:
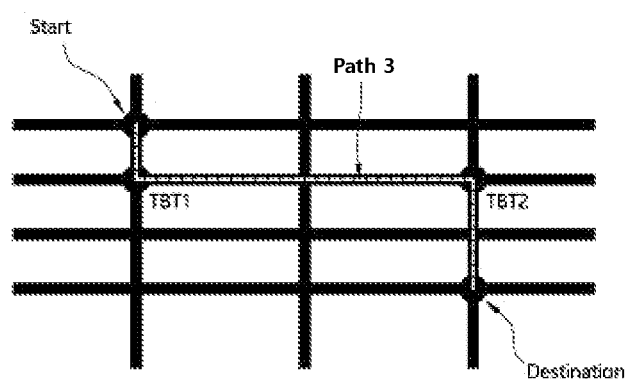

FIG. 6 illustrates an embodiment of traveling direction change information.

FIG. 6(a) shows an example of a global path generated using only a start point and a destination input by a user, and FIG. 6(b) shows an example of a global path generated using TBT generated by navigation system A in addition to the start point and the destination.

Referring to FIG. 6(a), it can be ascertained that a plurality of global paths (a dotted-line path 1 and a dashed-dotted line path 2) is generated since the autonomous vehicle generates a global path using only a start point and a destination.

Referring to FIG. 6(b), it can be ascertained that a single global path in which TBT (TBT1 and TBT2) has been reflected can be set since the autonomous vehicle needs to generate a global path (a dashed-dotted line path 3) using the TBT (TBT1 and TBT2) generated by the navigation system A 390 in addition to the start point and the destination.

The embodiments of present invention described above can be implemented as computer-readable code on a medium in which a program is recorded. Computer-readable media include all types of recording devices in which data readable by a computer system is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A driving system comprising:
   a vehicle; and
   a service platform configured to transmit a start point and a destination input by a user through a first standard definition (SD) map to the vehicle,
   wherein the vehicle is configured to:
      generate a global path by use of the start point, the destination, and a second SD map according to a preset program,
      generate a local path matching the global path by use of a high definition (HD) map stored in the vehicle, and autonomously drive the local path, and
   wherein:
      the first SD map has properties that do not match properties of the HD map and the second SD map, and
      the second SD map has properties matching the properties of the HD map.

2. The driving system according to claim 1, wherein the global path includes turn-by-turn (TBT) guidance between the start point and the destination.

3. The driving system according to claim 2, wherein the vehicle is configured to transmit at least one of a current location of the vehicle, a time duration required to arrive at the destination, and the TBT guidance to the service platform.

4. The driving system according to claim 3, wherein the service platform is configured to provide the at least one of the current location of the vehicle, the time duration required to arrive at the destination, and the TBT guidance to the user according to the first SD map.

5. The driving system according to claim 1, wherein the second SD map is stored in the vehicle.

6. The driving system according to claim 1, wherein the first SD map is provided by a navigation system to the user.

7. The driving system according to claim 6, wherein the navigation system is configured to:
   receive the start point and the destination input by the user,
   generate turn-by-turn (TBT) guidance between the start point and the destination, and
   transmit the start point, destination, and TBT guidance to the service platform.

8. The driving system according to claim 1, wherein the first SD map is received from an external navigation system and provided to the user, and wherein the external navigation system is different from a navigation system built in the vehicle.

9. The driving system according to claim 8, wherein:
   the vehicle transmits at least one of a current location of the vehicle, a time duration required to arrive at the destination, and a TBT guidance to the service platform, and
   the service platform provides the at least one of the current location of the vehicle, the time duration required to reach the destination, and the TBT guidance to the user according to the first SD map.

10. A method including:
    inputting, by a user, a start point and a destination by use of a first SD map provided by a service platform;
    transmitting, by the service platform, the start point and the destination to an autonomous vehicle;
    generating a global path, by the autonomous vehicle, by use of the start point, the destination, and a second SD map stored in the autonomous vehicle according to a preset program and generating a local path by use of the generated global path and a high definition (HD) map stored in the autonomous vehicle;
    operating the autonomous vehicle along the local path; and
    wherein:

the global path includes a turn-by-turn (TBT) guidance between the start point and the destination, the first SD map has properties that do not match properties of the HD map and the second SD map, and the second SD map has properties matching the properties of the HD map.

11. The method according to claim 10, further including transmitting, by the autonomous vehicle, at least one of a current location of the autonomous vehicle, a time duration required to arrive at the destination, and the TBT guidance to the service platform.

12. The method according to claim 11, further including providing, by the service platform, the at least one of the current location of the autonomous vehicle, the time duration required to reach the destination, and the TBT guidance to the user according to the first SD map.

13. A method for operating an autonomous driving system, the method including:

inputting, by a user, a start point and a destination by use of a first SD map received by a service platform from an external navigation system and provided to the user;

generating, by the external navigation system, a turn-by-turn (TBT) guidance by use of the start point and the destination and transmitting the start point, the destination, and the TBT guidance to the service platform;

transmitting, by the service platform, the start point, the destination, and the TBT guidance to an autonomous vehicle; and generating, by the autonomous vehicle, a global path by use of the start point, the destination, the TBT guidance, and a second SD map stored in the autonomous vehicle according to a preset program and generating a local path by use of the global path and a HD map stored in the autonomous vehicle, wherein the first SD map has properties that do not match properties of the HD map and the second SD map, the second SD map has properties matching properties of the HD map, and the external navigation system is different from a navigation system built in the autonomous vehicle.

14. The method according to claim 13, further including transmitting, by the autonomous vehicle, at least one of a current location of the autonomous vehicle, a time duration required to reach the destination, and the TBT guidance to the service platform.

15. The method according to claim 14, wherein the service platform provides the at least one of the current location of the autonomous vehicle, the time duration required to reach the destination, and the TBT guidance received from the autonomous vehicle to the user according to the first SD map.

16. A method for operating an autonomous driving system, the method including:

accessing, by a user, a service platform through a call software (SW);

determining whether a navigation system is able to generate a TBT guidance using a first standard definition (SD) map;

generating, by an autonomous vehicle, a first global path including the TBT guidance using a second SD map and a first local path matching the first global path using a high definition (HD) map upon determining that the navigation system is not able to generate the TBT guidance;

generating, by the navigation system, the TBT guidance using the first SD map;

generating, by the autonomous vehicle, a second global path including the TBT guidance using the second SD map and a second local path matching the second global path using the HD map upon determining that the navigation system is able to generate the TBT guidance; and operating the autonomous vehicle along the first local path or the second local path, wherein:

the first SD map has properties that do not match properties of the HD map and the second SD map, and the second SD map has properties matching the properties of the HD map.

17. The method according to claim 16, further including determining whether a path re-search is necessary during operation of the autonomous vehicle, wherein the determining of whether the navigation system is able to generate the TBT guidance is performed upon determining that the path re-search is necessary, and the operating of the autonomous vehicle is performed upon determining that the path re-search is not necessary.

* * * * *